United States Patent [19]

Keller

[11] 4,400,020

[45] Aug. 23, 1983

[54] PRESSURE TANK CONNECTOR

[76] Inventor: Russell D. Keller, P.O. Box 382, Clackamas, Oreg. 97015

[21] Appl. No.: 291,821

[22] Filed: Aug. 10, 1981

[51] Int. Cl.³ ........................... F16L 41/00; F16L 5/00
[52] U.S. Cl. ................................... 285/204; 285/220; 285/221
[58] Field of Search .............. 285/202, 204, 330, 219, 285/220, 221

[56] References Cited

U.S. PATENT DOCUMENTS

| | | | |
|---|---|---|---|
| 1,332,686 | 3/1920 | Reynolds. | |
| 1,355,936 | 10/1920 | Bentley | 285/202 |
| 1,718,610 | 6/1929 | Strama. | |
| 1,783,927 | 12/1930 | Rieke. | |
| 1,915,300 | 6/1933 | Draper | 285/202 X |
| 2,174,549 | 10/1939 | Blaho | 29/148.2 |
| 2,216,667 | 10/1940 | Holzkamper | 285/204 |
| 2,260,149 | 10/1941 | Meek | 29/148.2 |
| 2,327,656 | 8/1943 | Meek | 285/202 |
| 2,441,145 | 6/1948 | Rosan | 29/148 |
| 2,916,311 | 12/1959 | Keplinger | 285/202 |
| 3,124,267 | 3/1964 | Cetrone | 220/39 |
| 3,186,604 | 6/1965 | Pentesco | 222/191 |
| 4,129,236 | 12/1978 | Wrycraft et al. | 222/570 |

Primary Examiner—Richard J. Scanlan, Jr.
Attorney, Agent, or Firm—Klarquist, Sparkman, Campbell, Leigh, Whinston & Dellett

[57] ABSTRACT

A pressure tank connector apparatus is described with a connector fitting having a fitting insert sleeve of steel or other harder metal than the fitting body which is crimped over an outwardly extending flange or lip portion of the tank wall surrounding the opening in the pressure tank to which the connector is attached to position the fitting body within the tank and spaced inwardly from the flange. The fitting body is molded of aluminum alloy and the insert sleeve is embedded into the body during molding. A plurality of spaced hemispherical projections are molded onto the outer side of the fitting body and mate with correspondingly shaped indentations on the inner side of the tank wall portion surrounding such opening to prevent rotation of the fitting when a tank connector member is threaded into the central passage of such fitting body. A sealing ring of elastomer material is clamped between the outer side of the fitting body and the inner side of the tank wall at a position surrounding the fitting insert sleeve, in order to provide a gas tight seal. As a result, the pressure tank connector apparatus is safe and strong so that it is capable of withstanding much higher pressures than atmospheric pressure, such as a working pressure of 150 psi and a failsafe pressure of five times that amount. Thus, the invention is suitable for use as a connector for an air brake tank on a truck or other vehicle.

20 Claims, 3 Drawing Figures

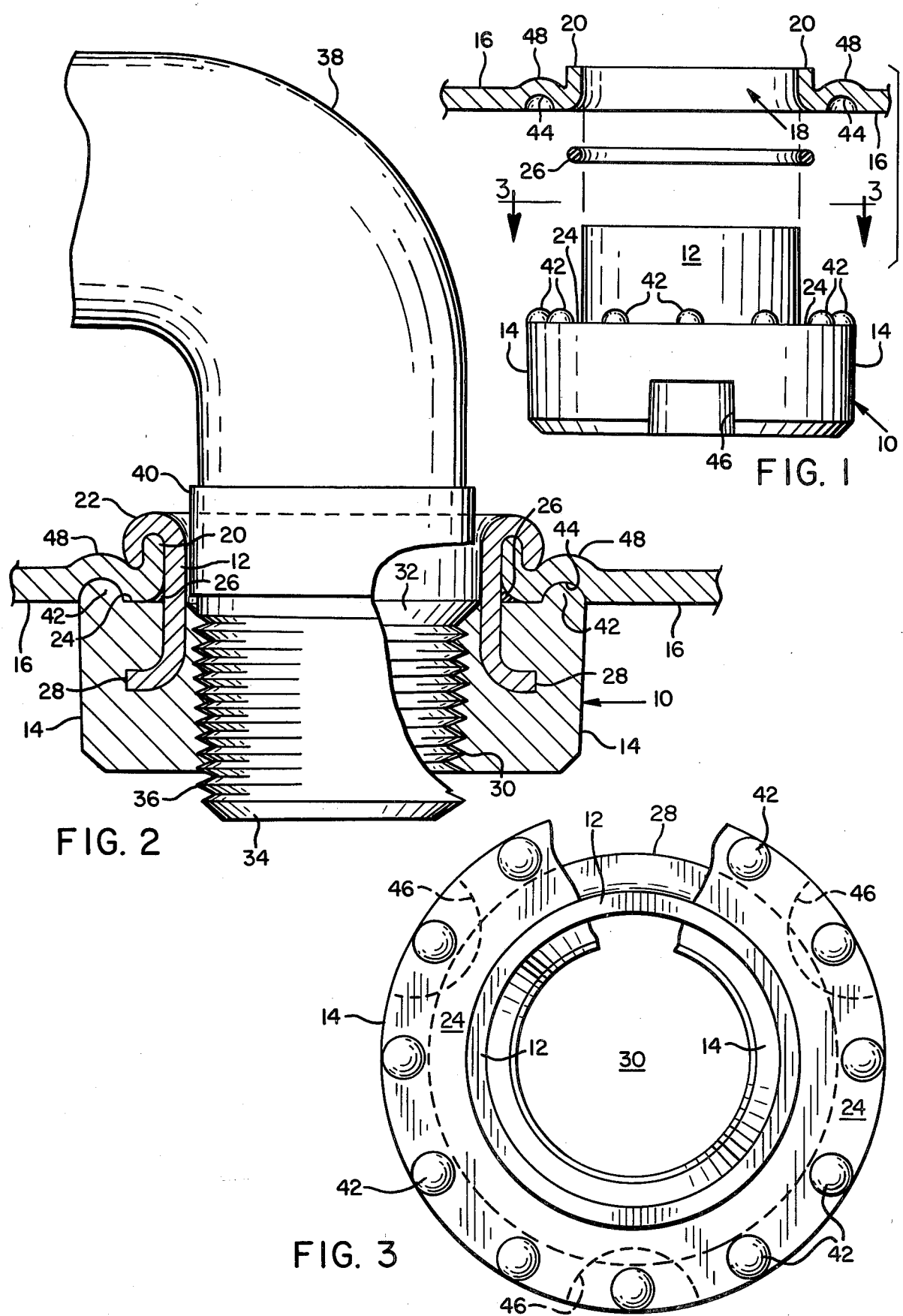

PRESSURE TANK CONNECTOR

BACKGROUND OF INVENTION

The subject matter of the present invention relates generally to pressure tank connector apparatus and in particular to such connector apparatus including a connector fitting having an insert sleeve of harder metal than the fitting body which is crimped or otherwise bent over a tank wall portion surrounding the connector opening to form a high pressure connection of great strength. As a result, the connector apparatus is suitable for high gas pressure tanks having working pressures many times that of atmospheric pressure. The pressure tank connector apparatus of the present invention has greater strength than previous connector apparatus employing welded fittings which are welded to the tank and by using a steel insert sleeve is stronger than those crimped fittings formed entirely of aluminum alloy. However, the present connector apparatus is less expensive to manufacture than all steel connectors by virtue of molding the body portion of the fitting from aluminum alloy or other metal of less hardness than the insert sleeve. In addition, the connector apparatus is made safer by positioning the fitting body within the pressure tank so that the entire threaded portion of the connector apparatus is positioned inside the inner surface of the tank wall. Hence, there is less likelihood of damage to the connector during traffic accidents or during handling of the pressure tank before it is attached to the vehicle.

It has previously been proposed in U.S. Pat. No. 3,124,267 of Cetrone, issued Mar. 10, 1964 to provide a sealed container connector with a crimped fitting sleeve extending from a hexagonal shaped fitting body which prevents rotation of such connector. However, this connector apparatus does not employ an insert sleeve of greater hardness than the fitting body. Also, the fitting sleeve is threaded and such threaded portion extends outside of the tank wall. A plastic plug which is threaded into the passageway of the fitting sleeve and fitting body is employed to produce a seal by means of a deformable knife edge on such plastic plug. The resulting connector apparatus is not suitable for an air brake tank or other high pressure container containing gas above atmospheric pressure. Instead, it appears to have been employed as a connector for an oil drum or other non-pressurized container of liquid.

A similar teaching is shown in U.S. Pat. No. 1,718,610 of Strama, issued June 25, 1929 and in U.S. Pat. No. 1,332,686 of Reynolds, issued Mar. 2, 1920, both of such show crimped connectors but do not employ fitting sleeves of harder metal than the fitting bodies and do not position the threaded portion of the fitting entirely within the tank. Also, with the connectors of these latter patents, the crimped connection is formed on the interior of the container and the free end of the fitting sleeve extends into the tank. This has the disadvantage of requiring the positioning of a crimping punch within the tank during fastening or fastening the connector to the tank wall before the tank is formed. The resulting connector apparatus is used for metal barrels containing liquid, apparently beer barrels, but is not suitable for high pressure tanks.

SUMMARY OF INVENTION

It is therefore one object of the present invention to provide an improved connector apparatus for a pressure tank which is sufficiently strong so that it is capable of withstanding high gas pressure within the tank many times greater than atmospheric pressure, but is relatively inexpensive to manufacture.

Another object of the invention is to provide such a pressure tank connector apparatus with a fitting sleeve of harder metal than the fitting body to which it is attached and having the free end of such sleeve crimped or otherwise bent over a wall portion of the tank surrounding the connector opening to fasten the connector apparatus in a simple and inexpensive manner while at the same time producing a strong, fluid tight connection.

An additional object of the invention is to provide a pressure tank connector apparatus which is of a safe construction and not easily damaged so that it can be used on air brake reservoir tanks or other containers of high pressure gas.

Still another object of the invention is to provide such a pressure tank connector apparatus in which the threaded passage of the connector is provided entirely inside the tank for greater protection and safety.

A still further object of the invention is to provide such a pressure tank connector apparatus in which the fitting body is molded and the fitting sleeve is embedded in such body during molding to reduce manufacturing costs.

Another object is to provide such a connector apparatus in which a plurality of projections are molded in the outer side of the fitting body for mating with corresponding indentations in the tank wall to prevent turning of the connector apparatus in a simple and inexpensive manner.

DESCRIPTION OF DRAWINGS

Other objects and advantages of the present invention will be apparent from the following detailed description of a preferred embodiment thereof and from the attached drawings of which:

FIG. 1 is an exploded side elevation view of the pressure tank connector apparatus of the present invention prior to assembly and with the tank wall in shown cross-section;

FIG. 2 is a cross-sectional view of the connector apparatus of FIG. 1 as assembled with parts broken away for clarity; and FIG. 3 is an elevational view taken along the line 3—3 of FIG. 1 with parts broken away for clarity.

DESCRIPTION OF PREFERRED EMBODIMENT

As shown in FIGS. 1 and 3, the pressure tank connector apparatus of the present invention comprises a connector fitting means 10 including an annular fitting sleeve 12 extending from one side of a fitting body 14. A pressure tank including tank wall 16 of steel or aluminum alloy is provided with a connector opening 18 for receipt of the fitting sleeve 12 which extends through such opening during assembly before bending or crimping the free end of such sleeve. An annular outwardly extending tubular flange or lip portion 20 is provided in the wall portion surrounding the periphery of the connector opening 18.

As shown in FIG. 2, the free end of the fitting sleeve 12 is bent outwardly or crimped over the lip portion 20 of the tank wall in order to clamp the fitting 10 to the tank wall between a shoulder portion 22 formed by the bent end of sleeve 12 and an outer side 24 of the fitting body 14. A sealing ring 26 of elastomer material such as a rubber O-ring is provided around the sleeve 12 and is clamped between the inner surface of the tank wall 16 beneath the lip 20 and the outer surface 24 of the fitting body 14 in order to form a gas tight seal between such members.

The fitting sleeve 12 is made of a harder metal than the fitting body 14, and such sleeve is fastened at one end to the fitting body, such as by embedding such one end into the body during molding of the body. Thus, the fitting body 14 may be made by molding it of an aluminum alloy material and a fitting sleeve 12 of harder, higher melting point metal, such as steel, having an outwardly flared bottom end 28 is embedded in the fitting body during molding.

As shown in FIGS. 2 and 3, the fitting body 14 is positioned inside the tank spaced inwardly of the flange 20 and of the wall portion 16 surrounding such flange toward the interior of the tank to prevent damage to the connector 10. The fitting body is provided with an internally threaded axial passageway 30 extending therethrough. The fitting sleeve 12 is not threaded and is positioned on the fitting body to surround the threaded passageway 30. It should be noted that the full thickness of the sleeve 12 is used to resist the pressure within the tank since no threads are formed in such sleeve. Thus, the fitting sleeve 12 may be made of 1010 or 1020 type steel having a thickness of about 0.065 inch. The tank wall 16 may be steel having a thickness of 0.062 to 0.125 inch. A beveled entrance opening 32 is provided at the outer end of the threaded passageway 30 for guiding a beveled end 34 on an externally threaded shaft 36 of a connector 38 for a fluid conduit, such as an air brake hose, into such passageway. The hose connector 38 is in the form of a 90° elbow having its outer end attached to the air hose and having its threaded inner end secured to the passageway 30 of the fitting member 10 for communication of the hose with the interior of the pressure tank 16.

The inner end of the hose connector 38 is provided with an outer flange portion 40 which is of slightly smaller diameter than the fitting sleeve 12 and is of slightly larger diameter than the outer diameter of the threaded shaft portion 36 of such inner end. Thus, the flange portion 40 slides within the sleeve 12 and is held against the outer side of the fitting body 14 over the beveled opening 34 when shaft 36 is threaded tightly into passageway 30. It should be noted that the threads of the shaft 36 and the passageway 30 are tapered threads such as 0.25-18 NPT (National Pipe Tap) pipe threads for a 0.437 inch minimum diameter passageway 30 or they may be 0.50-14 NPT threads for a 0.699 maximum diameter passageway 30. As the result of these tapered pipe threads, a gas tight seal is formed between the threaded shaft 36 of the hose connector 38 and the threaded passageway 30 of the fitting body 14 without need for an additional sealing member at most working pressures. However, it may be desirable to provide a sealing ring of elastomer material at very high working pressures, such as a rubber O-ring, around an unthreaded portion at the top of the threaded shaft 36 by providing an annualur slot in such shaft for holding such seal member immediately below flange portion 40.

A plurality of hemispherical shaped projections 42 are formed on the outer side of the fitting body 14 such as by molding them into the surface of the body. As shown in FIGS. 1 and 3, twelve projections 42 are equally spaced apart by 30° about the periphery of the fitting sleeve 12. An equal number of similarly spaced hemispherical indentations 44 are provided on the inner surface of the tank wall 16 surrounding the lip 20. As shown in FIG. 2, the projections 42 are mated with the indentations 44 when the fitting body 14 is clamped into engagement with the tank wall 16 to form a gripping means which prevents relative rotation of the fitting body 14 with respect to the tank wall, such as during attachment or detachment of the hose connector 38.

Three index slots 46 may be provided on the inner side of the fitting body 14 for holding such fitting body in position during crimping while the shoulder 22 is formed by bending the sleeve 12 over the lip 20. A plurality of raised surface portions or bumps 48 are formed on the tank wall outer surface immediately above the indentations 44 during their formation. The shoulder 22 of the sleeve 12 is positioned between the lip 20 and bumps 48 after crimping, as shown in FIG. 2. The fitting member 10 is clamped to the tank wall 16 between the sleeve shoulder 22 and the fitting body projections 42 as well as the flat surface portions of the outer side 24 of such body. As a result, an extremely strong connection which is gas tight at high pressure is formed between members 12, 14 and 16 and such gas tight seal is insured by the presence of the elastomer sealing ring 26 between such members.

A pressure tank connector apparatus made in accordance with the present invention will withstand a working pressure of about 120 to 150 psi and has been failsafe tested at five times the working pressure. Thus, such connector apparatus is capable of withstanding a pressure of 750 psi or over fifty times normal atmospheric pressure. The pressure tank connector apparatus of the present invention is suitable for use on high gas pressure tanks such as the air brake reservoir tank of a truck or other wheeled vehicle.

It will be obvious to those having ordinary skill in the art that many changes may be made in the above described preferred embodiment of the present invention. Therefore, the scope of the present invention should be determined by the following claims.

I claim:
1. A pressure tank apparatus comprising:
 a connector fitting means for sealing an opening in the wall of a pressure tank surrounded by an outwardly extending flange portion of the wall, and for coupling an external fluid conduit connector to the interior of said tank;
 said fitting means including a fitting body positioned inside said tank inwardly of the tank wall portion surrounding the flange portion and spaced inwardly from said flange portion toward the interior of the tank and having a passageway therethrough with internal threads for coupling to said conduit connector;
 a sleeve of harder material than the fitting body attached to said body surrounding said threaded passageway and extending outwardly from one side of the body to a free end, said free end extending through the opening in the tank wall and bending over the flange portion surrounding the periphery of said opening to clamp the fitting means to the tank; and
 gripping means for preventing said body from rotating relative to said tank wall by engagement with the tank wall.

2. Apparatus in accordance with claim 1 in which the fitting body and the sleeve are clamped to the wall of a pressure tank with said body positioned inside said tank.

3. Apparatus in accordance with claim 2 in which a sealing means for providing a fluid tight seal between said one side of said body and inside of the tank wall in a position surrounding said sleeve.

4. Apparatus in accordance with claim 3 in which the sealing means is a sealing ring of elastomer material.

5. Apparatus in accordance with claim 2 in which the free end of the sleeve is crimped over an outwardly projecting flange portion of the tank wall at the periphery of said opening.

6. Apparatus in accordance with claim 5 in which the other end of the sleeve is attached to the fitting body as a hard metal insert embedded in said body which is made of a softer metal than said sleeve.

7. Apparatus in accordance with claim 6 in which said body is molded of aluminum alloy and the sleeve is made of steel.

8. Apparatus in accordance with claim 2 in which a fluid conduit connector having external threads is threadedly fastened to the threads of said fitting body.

9. Apparatus in accordance with claim 4 in which the gripping means includes a plurality of projections extending outwardly from said one side of said body into engagement with the tank wall and spaced around said sleeve, said sealing ring being positioned between said sleeve and said projections.

10. Apparatus in accordance with claim 9 in which the tank wall is provided with a plurality of indentations spaced around the periphery of said opening in position to be engaged by said projections.

11. Apparatus in accordance with claim 1 in which the other end of the sleeve is attached to the fitting body as a hard metal insert embedded in said body which is made of a softer metal than said sleeve.

12. Apparatus in accordance with claim 11 in which said body is molded of aluminum material and the sleeve is made of a harder metal than said aluminum material.

13. A pressure tank apparatus comprising:
a pressure tank for holding gas under high pressure greater than atmospheric pressure;
a connector fitting means for sealing an opening in the wall of said pressure tank surrounded by an outwardly extending flange portion of the wall, and for coupling an external gas conduit to the interior of said tank;
said fitting means including a fitting body positioned inside said tank inwardly of the tank wall portion surrounding the flange portion and spaced inwardly from said flange portion toward the interior of the tank in engagement with the inner surface of the tank wall and having a passageway therethrough with internal threads for coupling to said conduit connector;
a sleeve of harder meterial than the fitting body extending outwardly from one side of said body to a free end and surrounding said threaded passageway, said free end extending through said tank wall opening and being bent over said flange portion of the wall forming the periphery of said opening to clamp the fitting means to the tank;
said threaded passageway of said fitting body being positioned inwardly of the tank wall toward the interior of the tank so that said passageway is entirely inside the inner surface of said tank wall; and
said free end of said sleeve extending outside the outer surface of said tank wall a distance less than the thickness of said body.

14. Tank apparatus in accordance with claim 13 which also includes gripping means provided on the fitting body for preventing said body from rotating relative to said tank wall by engagement with said tank wall.

15. Tank apparatus in accordance with claim 13 in which the gripping means includes a plurality of projections extending outwardly from said one side of said body into a plurality of indentations provided in the inner surface of the tank wall spaced around said opening.

16. Tank apparatus in accordance with claim 13 in which the sleeve is of harder material than the fitting body.

17. Tank apparatus in accordance with claim 16 in which the other end of the sleeve is attached to the fitting body as a hard metal insert embedded in said body which is made of a softer metal than said sleeve.

18. Tank apparatus in accordance with claim 17 in which said body is molded of aluminum alloy and the sleeve is made of a harder metal than said aluminum alloy.

19. Tank apparatus in accordance with claim 13 which also includes a sealing means for providing a gas tight seal between said one side of said fitting body and the tank wall in a position surrounding said sleeve.

20. Tank apparatus in accordance with claim 19 in which the sealing means is a sealing ring of elastomer material.

* * * * *